(12) United States Patent
Takeda

(10) Patent No.: US 7,683,957 B2
(45) Date of Patent: Mar. 23, 2010

(54) IMAGE SENSING APPARATUS FOR STABLE CLAMPING OPERATION AND DRAINING UNNECESSARY CHARGES

(75) Inventor: Nobuhiro Takeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1059 days.

(21) Appl. No.: 10/714,309

(22) Filed: Nov. 14, 2003

(65) Prior Publication Data

US 2004/0100569 A1    May 27, 2004

(30) Foreign Application Priority Data

Nov. 19, 2002    (JP) ............................. 2002-335097

(51) Int. Cl.
    *H04N 3/14*    (2006.01)
    *H04N 9/64*    (2006.01)
(52) U.S. Cl. .................. 348/314; 348/245; 257/230
(58) Field of Classification Search ................ 348/243, 348/245, 314, 315; 257/230
    See application file for complete search history.

(56) References Cited

U.S. PATENT DOCUMENTS

| | | | | |
|---|---|---|---|---|
| 6,211,915 B1 * | 4/2001 | Harada | ....................... | 348/298 |
| 6,476,941 B1 * | 11/2002 | Kondo et al. | ................. | 358/513 |
| 7,050,101 B2 * | 5/2006 | Wako et al. | .................. | 348/314 |
| 2001/0020909 A1 * | 9/2001 | Sakuragi et al. | ............. | 341/139 |
| 2001/0055068 A1 * | 12/2001 | Funakoshi et al. | .......... | 348/243 |
| 2002/0039144 A1 * | 4/2002 | Yamada | ...................... | 348/311 |

* cited by examiner

*Primary Examiner*—David L Ometz
*Assistant Examiner*—Dillon Durnford-Geszvain
(74) *Attorney, Agent, or Firm*—Cowan, Liebowitz & Latman, P.C.

(57) ABSTRACT

An object of this invention is to realize both stable clamping operation of a CDS circuit and an operation of draining unnecessary charges from a CCD. To achieve this object, during the storage period of an image sensing element, (A) vertical CCDs perform high-speed transfer or all the vertical CCDs are fixed to a LOW voltage, (B) a horizontal CCD is stopped, (C) the reset pulse of a floating diffusion amplifier is not stopped, and (D) a clamping pulse supplied to the CDS circuit is kept output. During this operation, the reference level of the floating diffusion amplifier is clamped. Stable clamping operation can, therefore, be executed during the storage period.

5 Claims, 8 Drawing Sheets

IMAGE SENSING APPARATUS FOR STABLE CLAMPING OPERATION AND DRAINING UNNECESSARY CHARGES

FIELD OF THE INVENTION

The present invention relates to an image sensing apparatus and, more particularly, to driving of an image sensing element in an electronic still camera or the like and particularly DC recovery operation of a signal processing method.

BACKGROUND OF THE INVENTION

Image sensing elements used in an electronic still camera and the like mainly adopt an interline CCD.

FIG. 6 is a view showing the arrangement of an interline CCD. The interline CCD comprises photodiodes 1 which are two-dimensionally arrayed, read gates 2 which read signal charges stored in the photodiodes 1, vertical transfer portions 3 which vertically transfer signal charges read via the read gates 2, a horizontal transfer portion 4 which horizontally transfers vertically transferred signal charges, and a charge detection portion 6 which is arranged at the horizontal transfer end of the horizontal transfer portion 4 and uses a known floating diffusion amplifier. A portion except the photodiodes 1 is shielded from light by aluminum or the like. Some photodiodes are shielded from light to form a horizontal optical black region 7 which outputs only a dark current component.

FIG. 7 shows conventional driving timings. During the storage period, light incident on the photodiodes 1 is photoelectrically converted and stored. During the storage period, the vertical transfer portions 3 are driven at high speed by high-speed vertical transfer pulses fV1 to fV4 of four phases to drain via the charge detection portion 6 unnecessary charges generated at the vertical transfer portions 3. At time t2, signal charges stored in the photodiodes 1 are read below the fV1 electrodes of the vertical transfer portions via the gates 2 in accordance with a signal read pulse superposed on fV1. Signal charges read to the vertical transfer portions 3 are transferred row by row to the horizontal transfer portion 4 every horizontal scanning in accordance with the vertical transfer pulses fV1 to fV4 of four phases. Signal charges transferred to the horizontal transfer portion 4 are sequentially transferred to the charge detection portion 6 in accordance with horizontal transfer pulses fH1 and fH2 of two phases. Signal charges are converted into a signal voltage, and the voltage is externally output from the image sensing element. The output signal undergoes OB clamping operation and then various processes.

FIG. 8 shows the arrangement of an OB clamping circuit. A signal output from the image sensing element is AC-coupled to a signal processing circuit 802 via a capacitor 801. OB clamping operation is to recover the DC component of an AC-coupled signal by using as a reference an output signal (OB signal) from the horizontal optical black region 7 of the image sensing element. While an OB signal is output, a switch 803 is turned on by an fOB pulse to connect a reference power supply 804 which outputs a reference voltage. As a result, the signal processing circuit side of the capacitor 801 is set to the same voltage as the reference voltage. While a photographed image signal is output, the switch 803 is turned off to generate an image signal by using the OB signal as a reference. After that, various processes are executed to obtain a final image signal.

In the prior art, unnecessary charges at the vertical transfer portions are drained during the storage period. A signal of unnecessary charges is also output from the image sensing element to a pixel output (OB signal) from the horizontal optical black region that serves as a black-level reference signal. Due to the signal output of unnecessary charges, OB clamping malfunctions. In order to prevent this malfunction, an OB clamping pulse is stopped during the storage period, or is prevented from entering the clamping circuit by using a blanking pulse. During this period, the capacitor which holds an input signal at the reference voltage is discharged by an internal resistance or the like, and cannot perform stable OB clamping operation immediately when an original image signal is input. The original reference voltage is set high so as to prevent an image signal from falling below the dynamic range of the circuit even with unstableness of OB clamping operation, resulting in large power consumption.

SUMMARY OF THE INVENTION

It is an object of the present invention to provide an image sensing apparatus capable of realizing both stable OB clamping operation and an operation of draining unnecessary charges from an image sensing element.

To achieve the above object, an image sensing apparatus according to the present invention is characterized by comprising an image sensing element having a photoelectric conversion portion at which a plurality of photoelectric conversion elements are two-dimensionally arrayed, vertical transfer portions which vertically transfer signal charges stored in the photoelectric conversion portion in accordance with a vertical transfer pulse, a horizontal transfer portion which horizontally transfers signal charges transferred from the vertical transfer portions in accordance with a horizontal transfer pulse, and a charge detection portion which converts signal charges transferred from the horizontal transfer portion into a signal voltage or a signal current, a switch which inputs a reference voltage from a reference power supply, and a driving circuit which, while signal charges are stored in the photoelectric conversion portion, stops the horizontal transfer portion, drains unnecessary charges generated at the vertical transfer portions of the image sensing element, inputs to one terminal of a capacitor a reset voltage that resets the charge detection portion, and inputs the reference voltage from the reference power supply to the other terminal of the capacitor by controlling the switch, wherein the charge detection portion and the switch are arranged at the two terminals of the capacitor.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Figure 1:
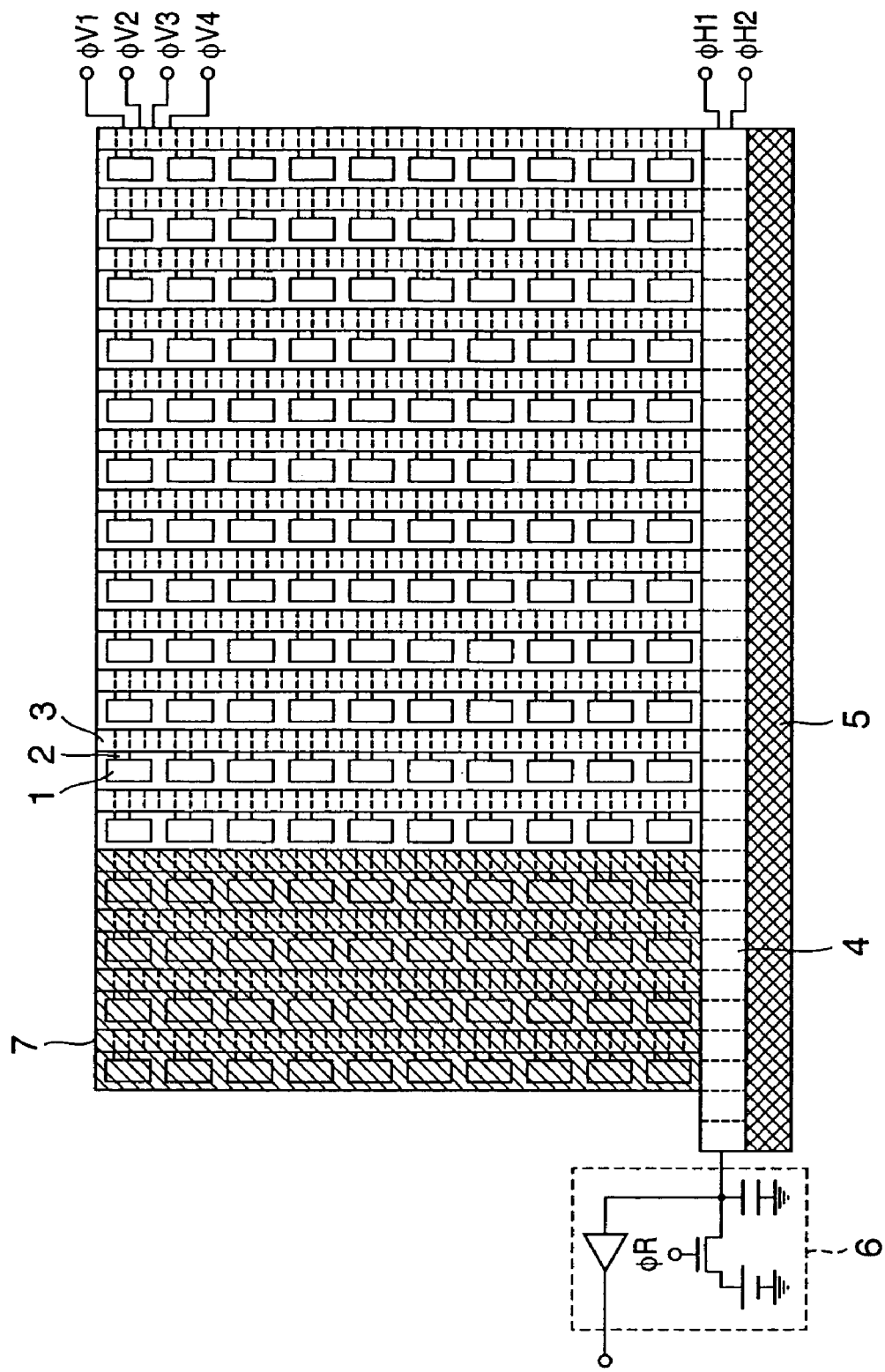
FIG. 1 is a view showing an image sensing element according to an embodiment of the present invention.

FIG. 1 is a view showing an image sensing element according to an embodiment of the present invention.

Figure 8:
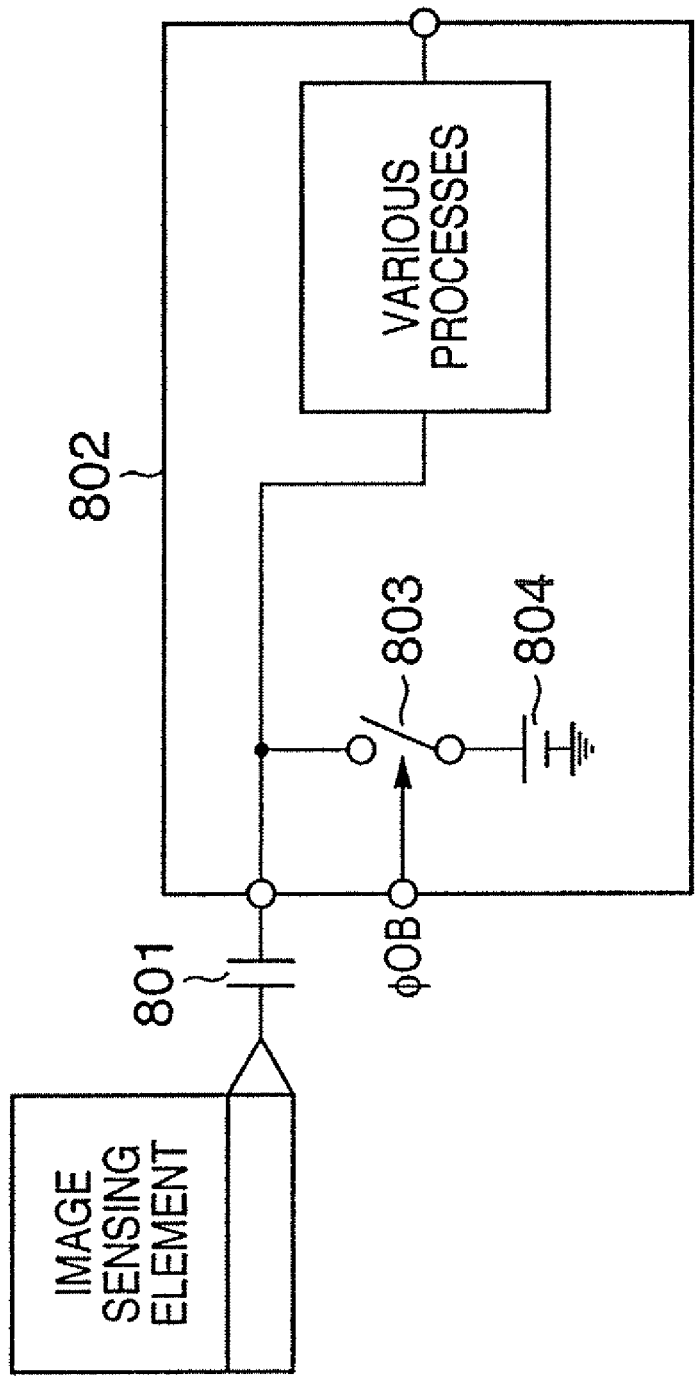
FIG. 8 is a diagram showing the arrangement of the signal processing circuit of the conventional image sensing apparatus.

This image sensing element is an interline CCD. The interline CCD comprises photodiodes 1 which are two-dimensionally arrayed, read gates 2 which read signal charges stored in the photodiodes 1, vertical transfer portions 3 which vertically transfer signal charges read via the read gates 2, a horizontal transfer portion 4 which horizontally transfers vertically transferred signal charges, a horizontal drain 5 which drains charges overflowing from the horizontal transfer portion 4, and a charge detection portion 6 which uses a known floating diffusion amplifier. At the charge detection portion 6, every time a signal of one pixel is output, a pulse is applied to fR to reset the floating diffusion amplifier, and a voltage corresponding to pixel charges is output. Some photodiodes are shielded from light to form a horizontal optical black region 7 which outputs only a dark current component. An OB clamping circuit has an arrangement in FIG. 8, similar to a conventional one, and a description thereof will be omitted.

Figure 2:
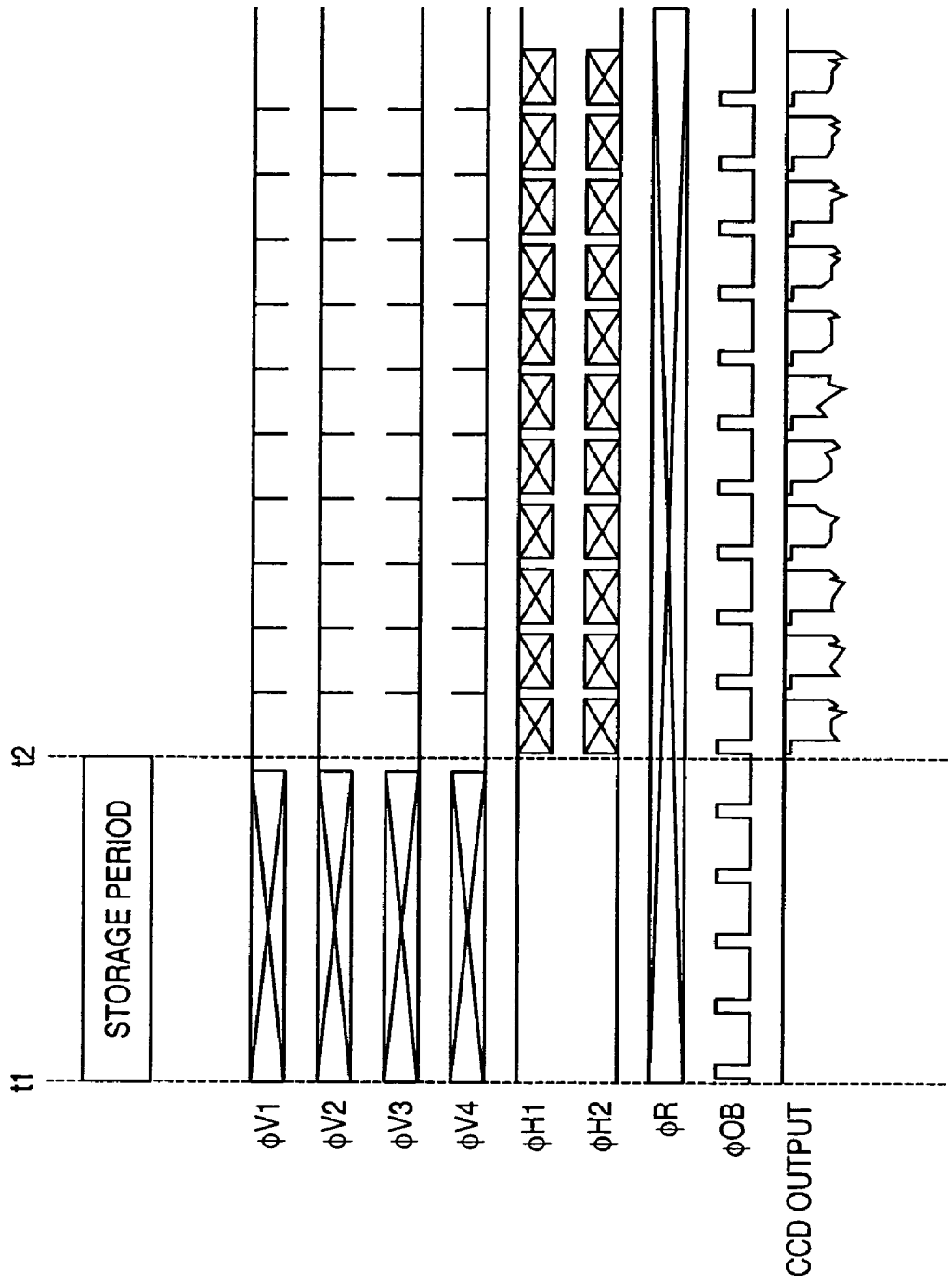
FIG. 2 is a timing chart showing the driving timings of an image sensing apparatus according to the embodiment of the present invention.

FIG. 2 shows driving timings according to the embodiment of the present invention.

During the storage period, light incident on the photodiodes 1 is photoelectrically converted and stored. During the storage period, the vertical transfer portions 3 are driven at high speed by high-speed vertical transfer pulses fV1 to fV4 of four phases to transfer unnecessary charges generated at the vertical transfer portions 3 to the horizontal transfer portion 4. At this time, fH1 and fH2 which drive the horizontal transfer portion 4 are fixed to a predetermined potential without receiving any pulse. Unnecessary charges transferred over the tolerance of the horizontal transfer portion 4 are drained to the horizontal drain 5. Even during the storage period, fR is applied to normally reset the floating diffusion amplifier. Hence, during the storage period, the image sensing element outputs a voltage corresponding the potential of the reset floating diffusion amplifier.

Similar to normal signal output, an fOB pulse which changes to High during a period corresponding to a horizontal OB output is applied to the OB clamping circuit to control a switch 803. In the embodiment, the switch 803 is ON while fOB is at High. That is, during the storage period, the OB clamping circuit clamps at a reference voltage a voltage corresponding to the potential of the reset floating diffusion amplifier. The voltage corresponding to the potential of the reset floating diffusion amplifier corresponds to an output voltage in the absence of any dark current from the photodiode, and thus is a minimum output voltage assumed by an output from the image sensing element. Even this voltage serving as a reference does not narrow the dynamic range of the image sensing apparatus.

At time t2, signal charges stored in the photodiodes 1 are read below the fV1 electrodes of the vertical transfer portions 3 via the gates 2 in accordance with a signal read pulse superposed on fV1. Signal charges read to the vertical transfer portions 3 are transferred row by row to the horizontal transfer portion 4 every horizontal scanning in accordance with the vertical transfer pulses fV1 to fV4 of four phases. Signal charges transferred to the horizontal transfer portion 4 are sequentially transferred to the charge detection portion 6 in accordance with horizontal transfer pulses fH1 and fH2 of two phases. Signal charges are converted into a signal voltage, and the voltage is externally output from the image sensing element. The output signal undergoes OB clamping operation using an OB signal as a reference voltage, and then undergoes various processes into a final image signal.

Figure 3:
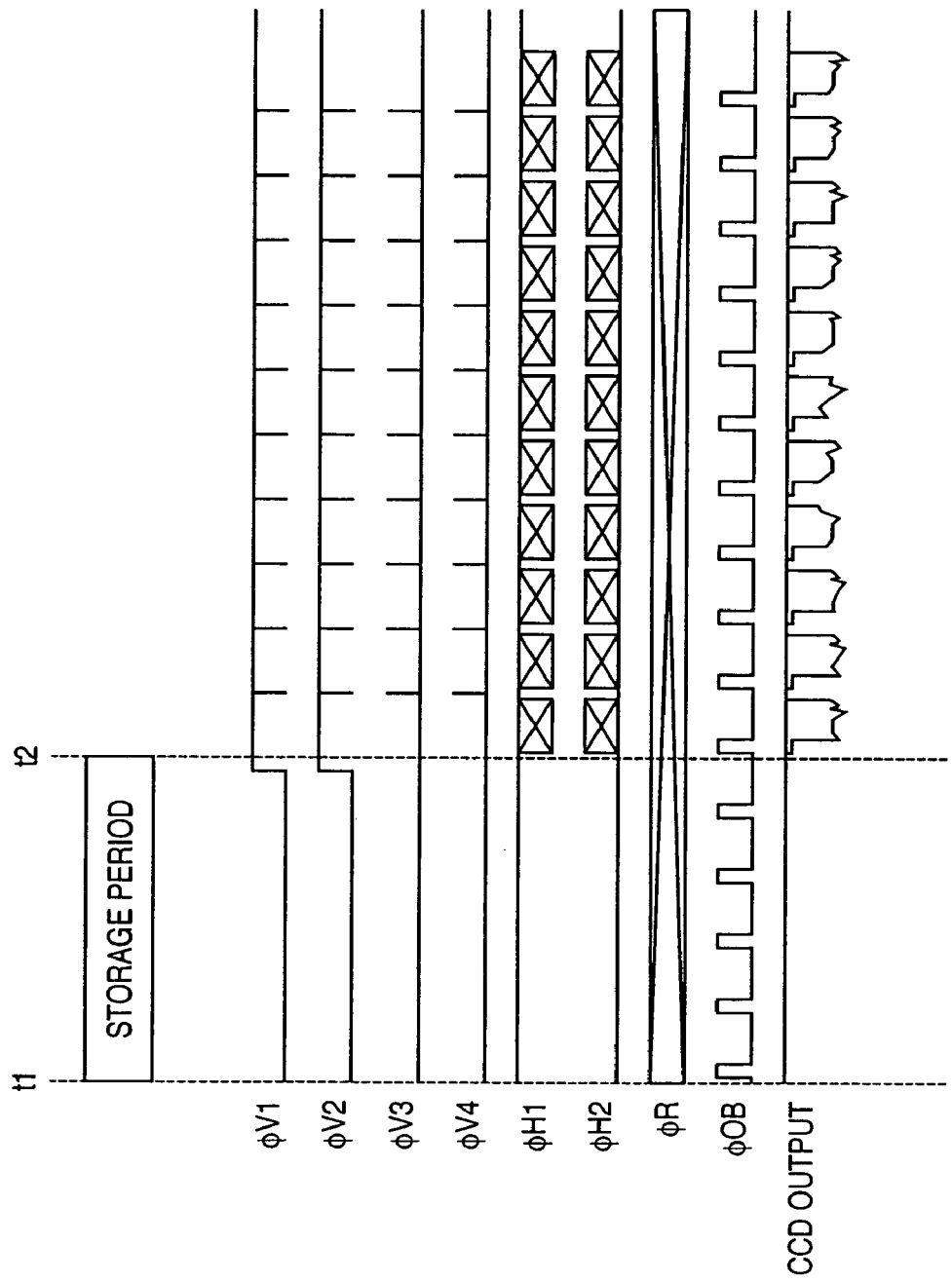
FIG. 3 is a timing chart showing driving timings when vertical transfer portions 3 are set to the same potential according to the embodiment of the present invention.

In the embodiment, unnecessary charges are drained by driving the vertical transfer portions 3 at high speed during the storage period. Unnecessary charges may be drained by setting the vertical transfer portions 3 to the same potential, as shown in FIG. 3. In FIG. 3, the vertical transfer portions 3 are set to a low voltage, i.e., a high-potential state.

Figure 4:
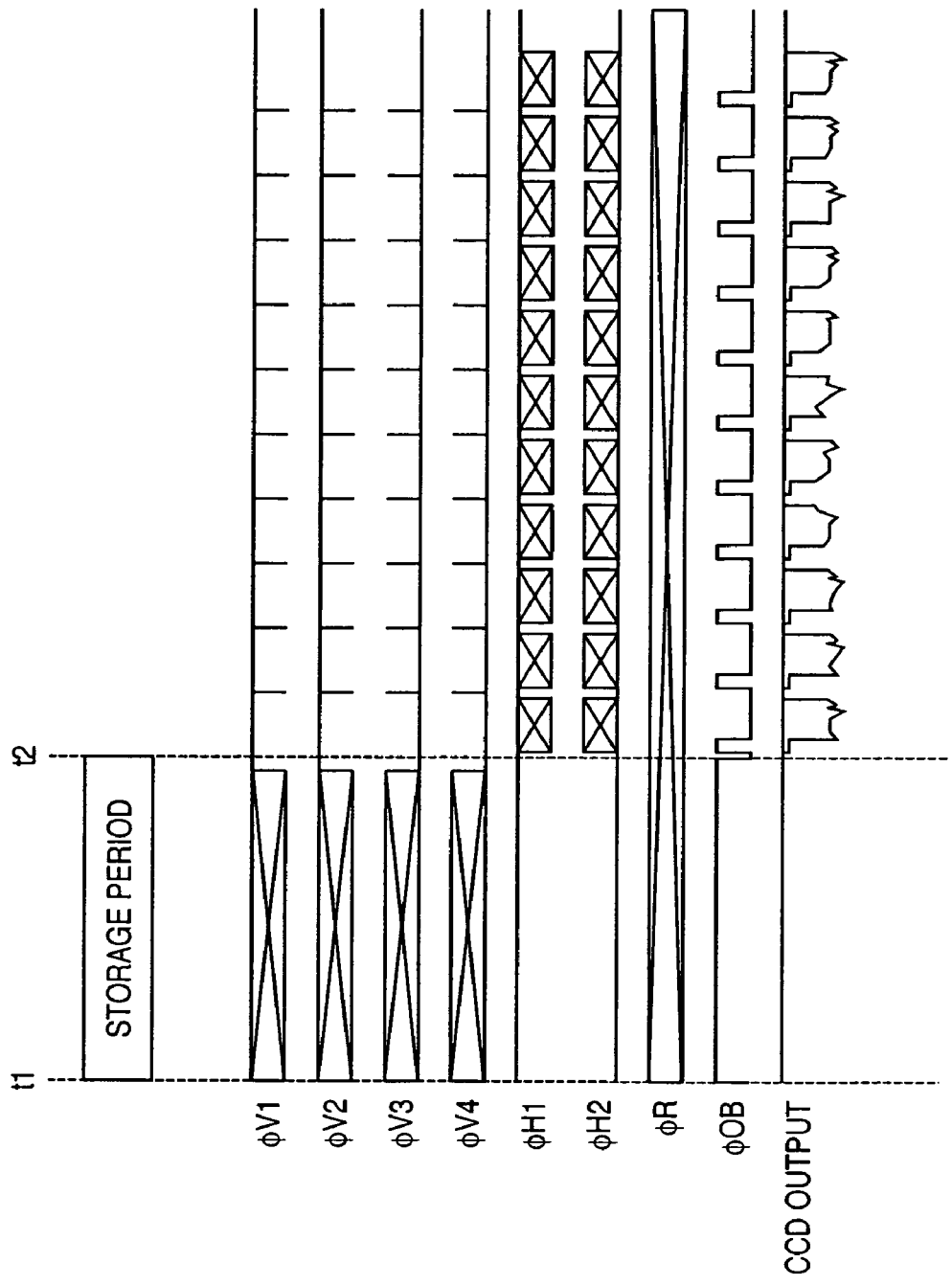
FIG. 4 is a timing chart showing driving timings when clamping operation is always performed during the signal charge storage period according to the embodiment of the present invention.
Figure 5:
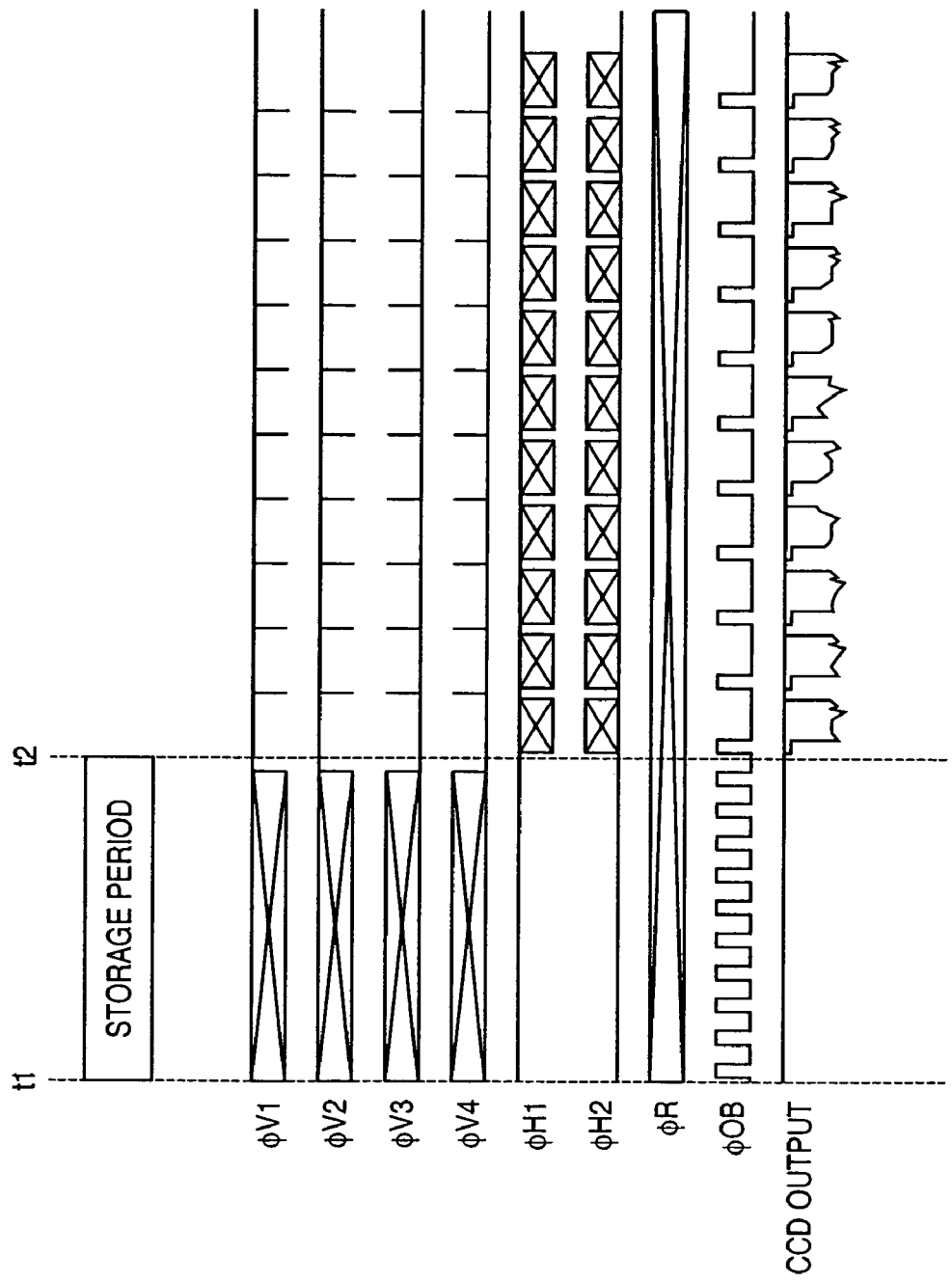
FIG. 5 is a timing chart showing driving timings when an fOB pulse whose frequency changes between the signal charge storage period and normal signal output is applied according to the embodiment of the present invention.
Figure 6:
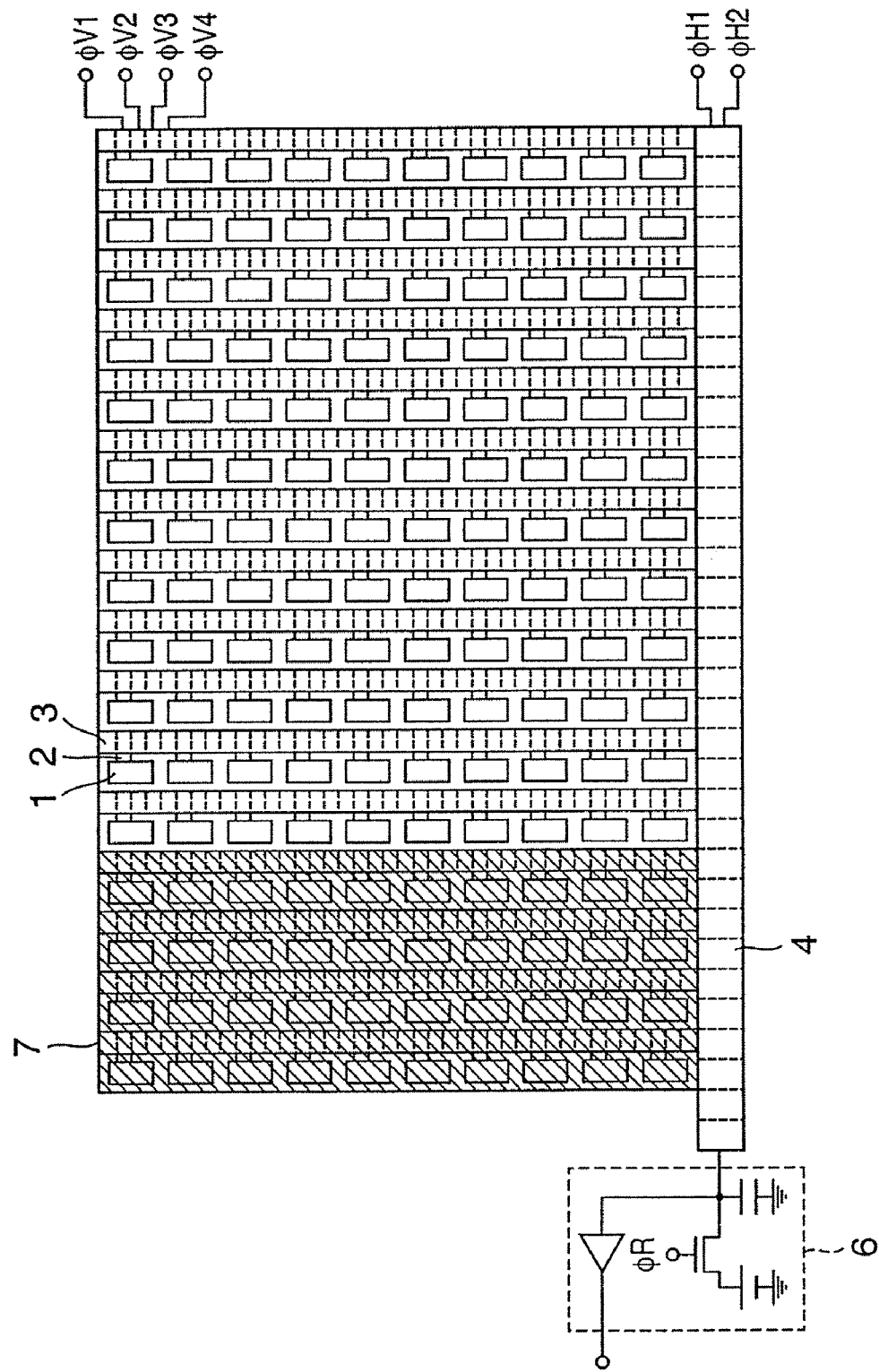
FIG. 6 is a view showing the arrangement of a conventional image sensing element.
Figure 7:
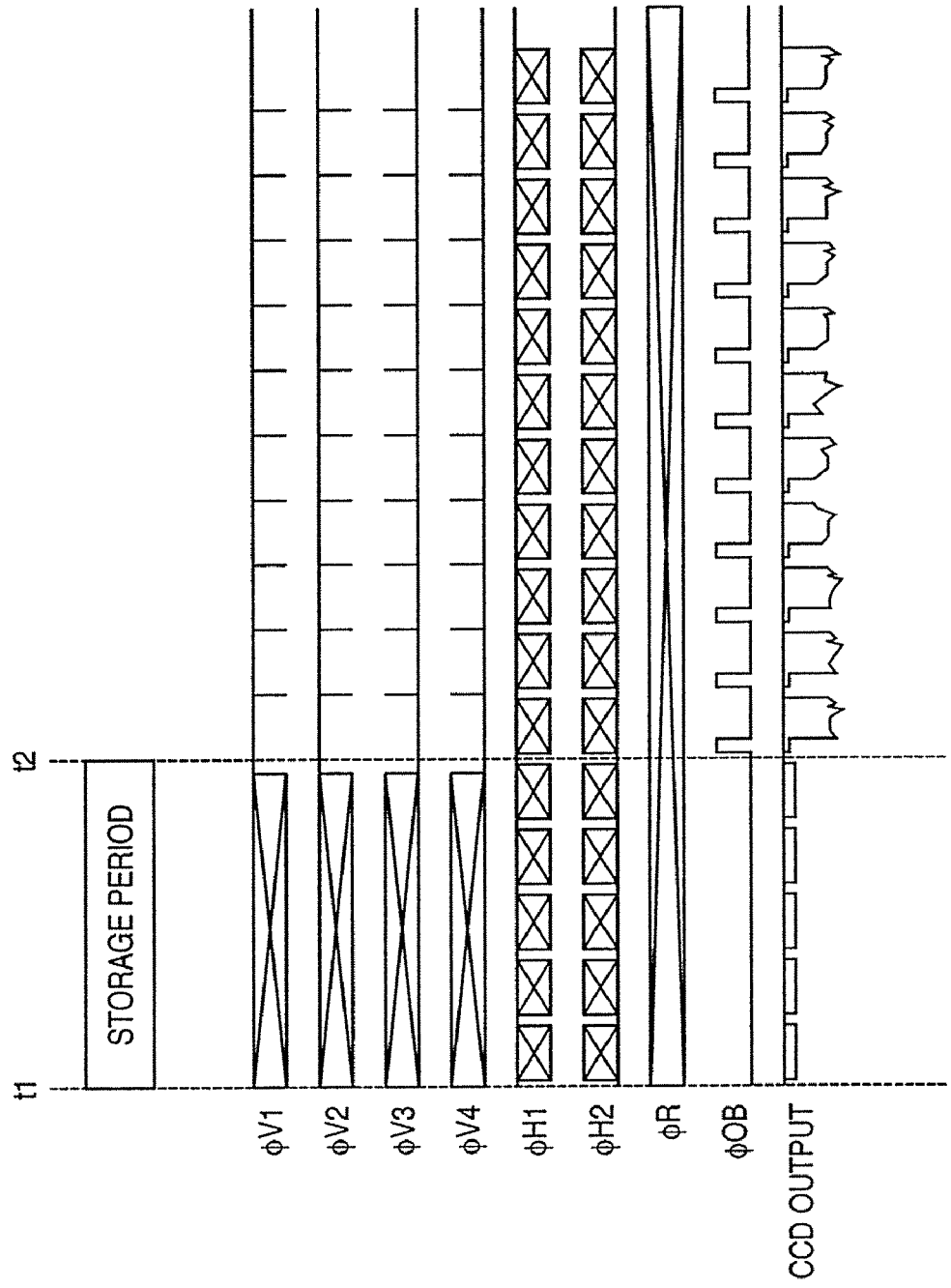
FIG. 7 is a timing chart showing the driving timings of a conventional image sensing apparatus.

Even during the storage period, an OB clamping pulse (fOB) identical to that in normal signal output is applied. As shown in FIG. 4, the pulse may always be set at High during the storage period, i.e., clamping operation may always be performed during the storage period. Further, the present invention is also effective when an fOB pulse whose frequency changes between the storage period and normal signal output is applied, as shown in FIG. 5.

As has been described above, this embodiment can realize both stable OB clamping operation and drainage of unnecessary charges from an image sensing element, and can obtain a high-quality image signal. Power saving can be realized by stopping the driving pulse of the horizontal transfer portion during the storage period.

The present invention is not limited to the above embodiments and various changes and modifications can be made within the spirit and scope of the present invention. Therefore, to apprise the public of the scope of the present invention the following claims are made.

What is claimed is:

1. An image sensing apparatus comprising:
   an image sensing element at which a plurality of photoelectric conversion elements are two-dimensionally arrayed, the image sensing element having a photoelectric conversion region which generates and stores signal charges of an object,
   an optical black region which outputs an optical black signal by shielding a part of the photoelectric conversion elements from light,
   a vertical transfer portion which vertically transfers the signal charges stored in the photoelectric conversion region in accordance with a vertical transfer pulse,
   a horizontal transfer portion which horizontally transfers the signal charges transferred from the vertical transfer portion in accordance with a horizontal transfer pulse,
   a horizontal drain portion which drains unnecessary charges overflowing from the horizontal transfer portion, and a charge detection portion which converts the signal charges transferred from the horizontal transfer portion into a signal voltage; and
   an OB clamping circuit which clamps the optical black signal output from the optical black region to a reference voltage, the OB clamping circuit having a switch which inputs the reference voltage from a reference power supply, and a capacitor, wherein the image sensing element is configured in such a way that the vertical transfer portion is driven with high-speed by providing the vertical transfer pulse and the unnecessary charges generated in the vertical transfer portion are transferred to the horizontal transfer portion, providing the horizontal transfer pulse to the horizontal transfer portion is stopped, and resetting operation of the charge detection portion and clamping operation of the OB clamping circuit are continued while the signal charges are stored in the photoelectric conversion region.

2. The apparatus according to claim 1, wherein the horizontal drain portion which drains unnecessary charges is arranged adjacent to the horizontal transfer portion in a vertical direction of the horizontal transfer portion, and when the unnecessary charges generated at the vertical transfer portion of said image sensing element reaches a predetermined amount at the horizontal transfer portion, the unnecessary charges are drained through the horizontal drain portion.

3. The apparatus according to claim 1, wherein while the signal charges are stored in the photoelectric conversion portion, the vertical transfer portion is driven at a high speed to drain the unnecessary charges generated at the vertical transfer portion of said image sensing element.

4. The apparatus according to claim 1, wherein while the signal charges are stored in the photoelectric conversion portion, potentials of the vertical transfer portion is set to the same potential to drain the unnecessary charges generated at the vertical transfer portion of said image sensing element.

5. The apparatus according to claim 1 further comprising a driving circuit configured to drain unnecessary charges generated at the vertical transfer of said image sensing element through the horizontal drain portion if the unnecessary charges are transferred over a tolerance of the horizontal transfer portion.

* * * * *